Figure 1:
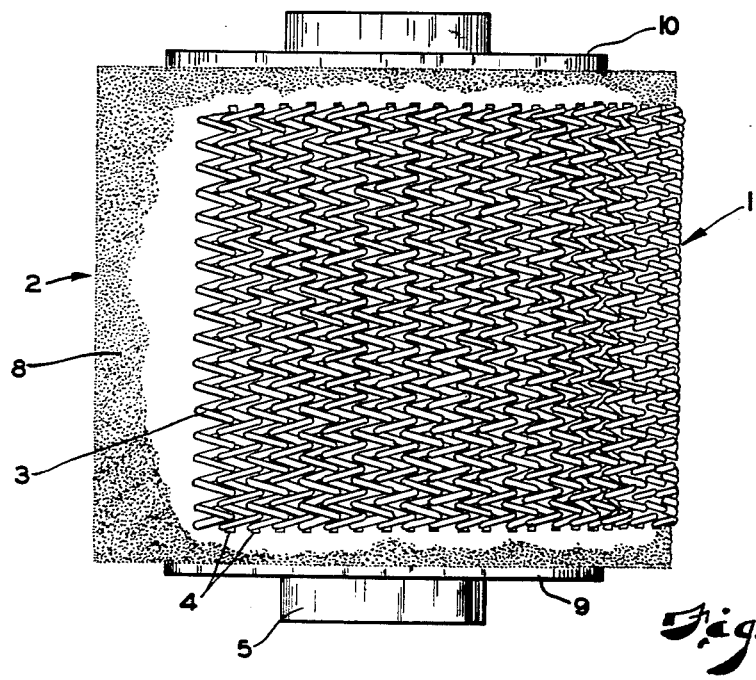

June 14, 1960 — M. VAMVAKAS — 2,940,586

INTERENGAGING BELT AND PULLEY

Filed July 14, 1958

INVENTOR.
MICHAEL VAMVAKAS
BY
Oberlin & Limbach
ATTORNEYS

United States Patent Office 2,940,586
Patented June 14, 1960

2,940,586

INTERENGAGING BELT AND PULLEY

Michael Vamvakas, Rocky River, Ohio, assignor to The Osborn Manufacturing Company, Cleveland, Ohio, a corporation of Ohio Filed July 14, 1958, Ser. No. 748,358

3 Claims. (Cl. 198—203)

This invention relates as indicated to an interengaging belt and pulley combination, and more particularly to a screen belt conveyor trained about a drive pulley which will not only interengage therewith but will also produce certain additional advantageous effects.

Screen, woven wire, wire mesh and perforated conveyor belts are employed for a wide variety of purposes in industry and sometimes such belts are also employed as drive belts themselves. In a typical installation, wire mesh belts are employed to convey bottles for washing and filling in a bottling plant. Precisely controlled travel of the conveyor is important for such purposes but there is a common tendency for the conveyor belt to slip or creep on the pulleys employed, even rubber-surfaced pulleys, especially when these are wet. Such creeping and slipping obviously interferes seriously with the accurate control necessary for the operation of automatic bottle filling machinery and the like.

In other installations, conveyor belts of the general type under consideration may be utilized to transport materials which may include a certain amount of dirt, pebbles and the like tending to clog the belt, damage the pulleys, and cause excessive wear of the belt itself. Various devices have been proposed to clean the belts but these have not always proved as effective as desired.

It is accordingly an important object of my invention to provide an interengaging belt and pulley, such belt being of the "screen" type (including woven wire and perforated sheet material) effective to prevent slipping between the belt and pulley so as to afford a positive drive for the belt.

Another object of this invention is to provide such combination in which the belt is uniformly supported across its width by such pulley means.

Still another object is to provide such belt and pulley combination automatically operative to clean the openings in such belt as it passes about the pulley.

A further object is to provide such pulley, the belt engaging surface of which is capable of yielding slightly to absorb sudden jerks and jolts without, however, allowing any slippage.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 2:
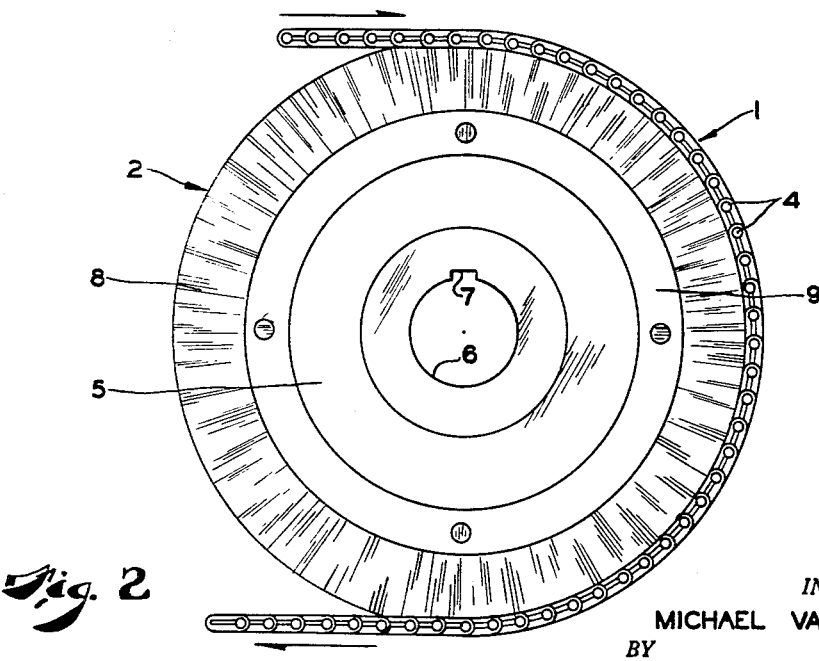

In said annexed drawing:

Fig. 1 is a top plan view showing a portion of a woven wire conveyor belt trained about a drive pulley in accordance with my invention; and Fig. 2 is an end elevational view of such pulley and belt combination.

Referring now more particularly to such drawing, in the embodiment illustrated a woven wire belt 1 is trained about a pulley comprising a cylindrical rotary brush 2. Such belt may comprise a plurality of transversely extending helically wound wire coils 3 interengaged by pins or rods 4 to form a continuous flexible belt having a multitude of apertures therethrough. As indicated above, a variety of other types of screen belts are contemplated for employment in accordance with this invention, it merely being necessary that they be flexible and provided with large numbers of small apertures therethrough.

The cylindrical rotary brush illustrated comprises a central hub 5 having a central opening 6 therein provided with a keyway 7 adapted to be mounted upon an appropriate spindle drive shaft or the like in driven engagement therewith. The brush material 8 may desirably be secured in a number of annular brush sections of the type disclosed in Whittle Patent 2,288,337, for example, such annular sections being closely axially compacted together and secured on hub 5 by clamping end plates 9 and 10. The brush bristle material 8 will be selected with regard to the particular type of conveyor and conveying operation with which it is to be utilized but may ordinarily comprise crimped steel wire or stainless steel wire when wet or high temperature operations are involved. A relatively dense fill is desired so that the brush bristle ends will ordinarily penetrate approximately only one-half way through the over-all thickness of the conveyor belt. This is sufficient to ensure good driving interengagement of the belt and pulley throughout the co-extensive surfaces of the same and also to permit such bristles to clean the belt, the bristles more particularly being effective to poke out material tending to clog the apertures in the belt. If desired, a jet of water may be played upon the surface of the belt where it passes about the pulley to assist in flushing away such dislodged material. Alternatively, water under pressure may be introduced to the interior of the brush and caused to flow outwardly through the brush material similarly to flush away the material tending to clog the conveyor apertures. Reference may be had to Peterson Patent 2,739,429 for one type of cylindrical rotary brush adapted thus to have fluid introduced therein for radial discharge through the brush material.

I ordinarily prefer to utilize a cylindrical rotary brush made up of a plurality of annular sections as explained above rather than to employ helically wound brush strip in forming the drive pulley surface since there may be a tendency of the belt gradually to shift laterally when trained about a cylindrical brush of the latter type. In some instances and when utilizing brush bristle material of a type where that of adjacent turns tends to become thoroughly intermixed, brushes formed of such helically wound brush strip (see Peterson Patent 2,303,386) may nevertheless be suitable.

As is usual in brushes, the brush bristles although preferably forming a rather dense brush face, are nevertheless capable of a certain amount of movement, and to such extent resiliently engage the conveyor belt. Accordingly, a sudden jerk imposed upon such belt is taken up to a degree by such momentary yielding action of the brush material. The brush pulley nevertheless is sufficiently solid in effect to ensure accurate driving of the belt for synchronization with automatic equipment such as that employed in bottling plants, for example.

It will be seen from the foregoing that I have provided a novel belt and pulley combination wherein several troublesome problems have been eliminated with attendant improvement in smoothness and accuracy of operation. If desired for certain operations, elastomeric material such as sponge neoprene may be intruded and molded into the body of brush material as, for example, described in Vernon K. Charvat application, Serial No. 686,500, filed September 26, 1957, for "Manufacture of Composite Brushing Tool," the brush bristles being substantially completely embedded in the cylindrical body of elastomeric material. The extreme outer ends of the brush bristles which may be of crimped wire will protrude from the sponge neoprene body so as to interengage the screen mesh belt, the neoprene body assisting in supporting the belt and also in supporting the brush bristles.

Conveyors of the type with which the present invention is concerned are widely employed in the food processing industry, especially in canneries, bottling plants and bakeries. They are also utilized for the purpose of transporting articles to be heat treated through the heat treating ovens. It has been the general practice to drive the screen mesh conveyor belts by means of chains and sprockets which add considerably to the cost of the equipment. Rubber or laminated pulleys are ordinarily not suitable for high temperature applications and also permit undesirable slippage when wet with soap solutions and the like, as in bottle washing machines. If the rubber is soft enough to obtain a driving grip on the belt, it will ordinarily soon become cut and damaged and require replacement. When the belt is put under high tension in order to obtain better frictional engagement with a drive pulley, this, of course, has necessitated the employment of more powerful and therefore more expensive drive motors. Not infrequently, drive pulleys employed in the past have permitted unequal slippage of the belt at one side edge of the latter relative to its other side edge so that the belt eventually may become twisted and distorted.

In some installations, it may be desired that the belt drive or turn the pulley as, for example, when a soap or other cleaning solution is to be applied to the traveling belt from a reservoir of such solution. In some instances, I may mount my rotary brush partially immersed in such solution and contacting the traveling belt with the extreme outer end portions of the brush bristles interengaging the mesh so that such brush will be driven by the traveling belt to pick up liquid from the reservoir and apply it to the belt. Obviously, a variety of various liquids such as lubricating oils and the like may be similarly applied if desired.

As used in the claims, the term "screen" is intended to be generic and includes both woven and perforated types. Likewise, the term "bristles" is intended to be inclusive of wire and other well-known types of non-animal bristles.

Other modes of applying the principle of the invention may be employed, change being made as regards the details described, provided the features stated in any of the following claims or the equivalent of such be employed.

I therefore particularly point out and distinctly claim as my invention:

1. A conveyor belt and drive pulley assembly comprising a power driven cylindrical brush having a hub and a dense fill of crimped wire brush bristle material extending generally radially outwardly therefrom; and a woven wire screen mesh conveyor belt trained about said brush with the outer end portions of said bristles in interengagement with such mesh effective to afford a non-slipping drive therefor while nevertheless being capable of slight resilient yielding action under conditions of temporary severe stress on said belt, said bristles penetrating the apertures of such mesh sufficiently to loosen extraneous material which may otherwise tend to clog such mesh.

2. The assembly of claim 1, wherein the ends of said bristles penetrate the apertures of such mesh at least one-half the thickness of said belt.

3. The assembly of claim 1, wherein said bristles are resiliently flexible to permit a certain amount of resilient tensioning of said belt.

References Cited in the file of this patent
UNITED STATES PATENTS

| | | |
|---|---|---|
| 746,089 | Jessup | Dec. 8, 1903 |
| 2,041,091 | Savy | May 19, 1936 |
| 2,859,861 | Sheehan | Nov. 11, 1958 |